United States Patent [19]

Wiese

[11] Patent Number: 4,511,149
[45] Date of Patent: Apr. 16, 1985

[54] MECHANICAL SEAL WITH CYLINDRICAL BALANCE SLEEVE

[75] Inventor: Winfred J. Wiese, Whittier, Calif.

[73] Assignee: Borg-Warner Corporation, Chicago, Ill.

[21] Appl. No.: 537,229

[22] Filed: Sep. 29, 1983

[51] Int. Cl.³ .......................... F16J 15/38; F16J 15/48
[52] U.S. Cl. ........................................... 277/3; 277/27; 277/29; 277/87; 277/93 SD
[58] Field of Search ...................... 277/3, 27, 81 R, 29, 277/83, 85-87, 75, 76, 93 R, 93 SD

[56] References Cited

U.S. PATENT DOCUMENTS

| | | | |
|---|---|---|---|
| 3,119,623 | 1/1964 | Shevchenko | 277/3 |
| 3,315,968 | 4/1967 | Hanlon | 277/3 |
| 3,813,103 | 5/1974 | Wiese | 277/27 |
| 4,114,900 | 9/1978 | Wiese | 277/27 |
| 4,174,844 | 11/1979 | Zobens | 277/85 |
| 4,272,084 | 6/1981 | Martinson | 277/30 |
| 4,381,867 | 5/1983 | Ohgoshi | 277/3 |

Primary Examiner—Robert S. Ward
Attorney, Agent, or Firm—Aubrey L. Burgess

[57] ABSTRACT

A mechanical seal assembly comprising rotatable and stationary seal rings with faces opposing one another. Means are provided to insure a pressure balance on the outside surface and on the inside surface of the softer seal ring, so that this seal ring does not deflect and distort, and wear in an undesirable manner.

12 Claims, 2 Drawing Figures

U.S. Patent     Apr. 16, 1985     4,511,149
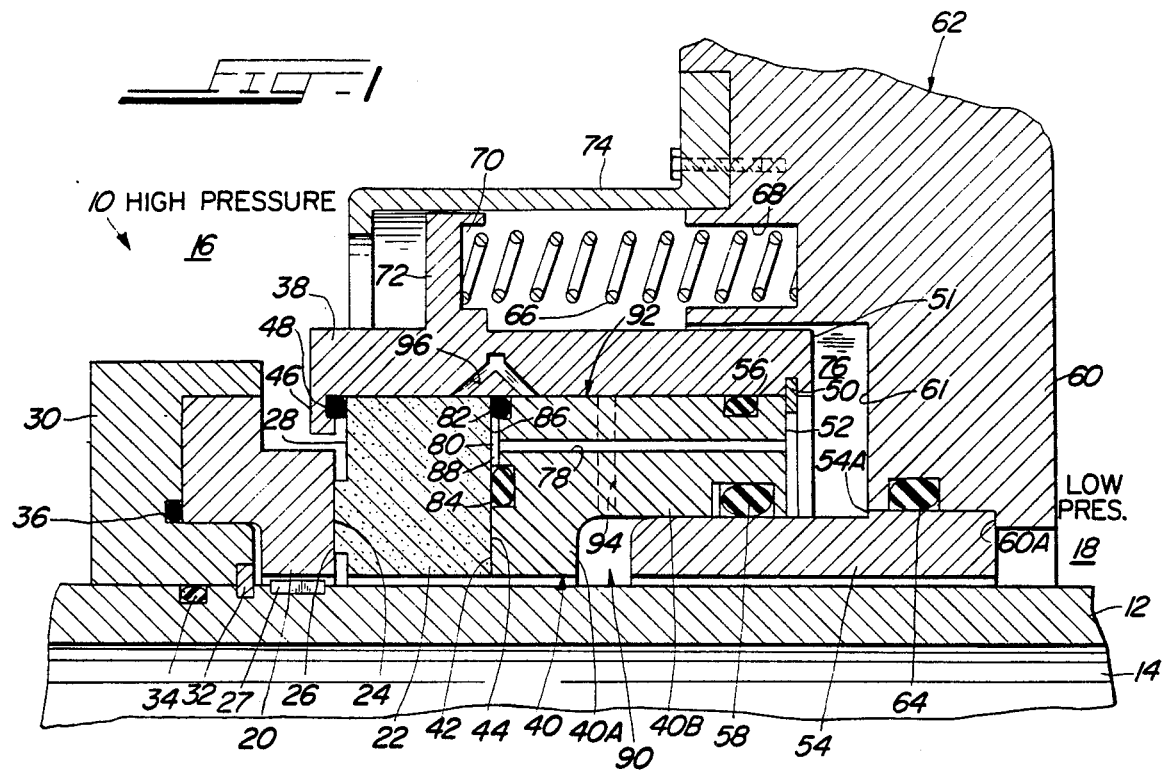
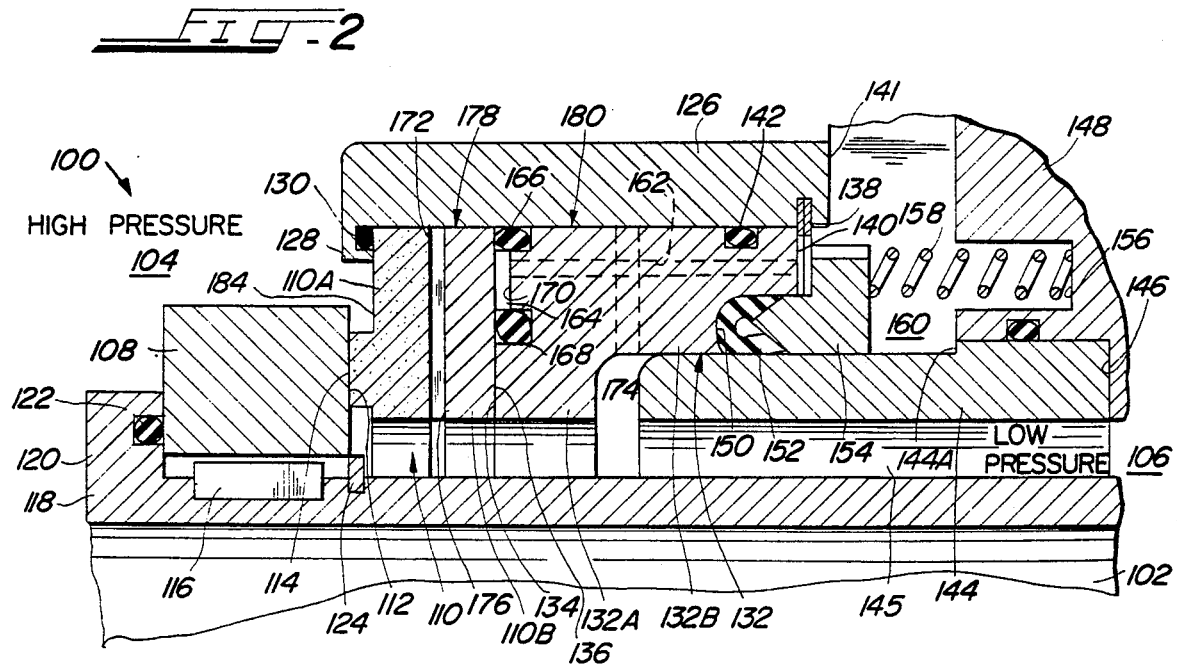

MECHANICAL SEAL WITH CYLINDRICAL BALANCE SLEEVE

BACKGROUND OF THE INVENTION

This invention relates to improvements in high pressure mechanical seal assemblies constructed and used to prevent the uncontrolled leakage of a liquid along a rotating shaft, as for example, leakage along the shaft of a rotary liquid pump.

The present invention was developed especially for use with nuclear reactor coolant pumps, boiler recirculating pumps, boiler feed pumps and pipeline pumps, and will meet the requirements for extreme and widely changing conditions of pressures and temperatures encountered in these uses, it being understood that the present invention can also be used in less demanding installations. As an example of the widely changing pressures and temperature, the normal operating pressure in a pressurized water reactor is about 2200 psig, and during start-up, the pressure can be as low as 20 to 30 psig. In such reactor, the water in a coolant loop can reach a temperature of about 600° F., while the water entering the seal area may be as low as about 80° F. In these pumps, the pump shaft may move axially and may also wobble or deflect radially. An additional rigorous operating condition for the seals in such application is the combination of high pressure and high surface speeds which result from large diameter parts. It is thus necessary to construct a mechanical seal assembly capable of performing under these operational conditions.

Mechanical seal assemblies usually comprise the combination of a rotatable seal ring connected to a rotatable shaft for rotation therewith, and a non-rotatable or stationary seal ring connected to the flange of a housing. Each seal ring has a radial seal face and the seal faces oppose one another. Whether or not the seal faces engage one another is debatable because there is usually a film of fluid therebetween providing lubrication and cooling for the relative rotation between the faces. In some mechanical seals leakage across the seal face is controlled. In many seal assemblies, one or more coil springs urge one of the rings toward the other, so that in reality, one or both of the seal rings are capable of limited axial movement, even though they are commonly referred to as "rotatable" or "stationary". Many conventional mechanical seals can be used as single stage seals or in a multiple stage seal assembly.

In a common type of mechanical seal, one of the seal rings is constructed of a relatively brittle, soft material, such as carbon, whereas the opposing ring is constructed of a harder material, such as titanium carbide, silicon carbide, and the like. In many of these seal assemblies, the carbon ring is "backed up" by a back-up ring constructed of a harder material, such as a stainless steel. The mating faces of the relatively brittle, soft seal ring and the back-up ring are lapped, so that the carbon ring becomes stuck or "married" to the back-up ring. Because of the difference in the modulus of elasticity between the two materials of the seal ring and the back-up ring, i.e., carbon with a modulus of about $2 \times 10^6$ to about $4 \times 10^6$ and 18-8 stainless steel with a modulus of about $30 \times 10^6$, a compressive load on the mated rings will cause the carbon ring to shrink more diametrically than the back-up ring. The carbon ring, being married to the back-up ring, will shrink more at its seal or running face, so that this face becomes concave which seriously affects the sealing area of the distorted face, leading perhaps to failure of the seal. The compressive load is mainly due to excessive differentials of the pressures on the inside and outside surfaces of the married rings, which frequently exist in the before-enumerated pumps.

DESCRIPTION OF PRIOR ART

Zobens, U.S. Pat. No. 4,174,844, describes a mechanical seal for high pressure sealing applications having a carbon seal ring, supported on a rigid backing ring, in sliding contact with a seal ring of dissimilar material. A barrier is provided in overlying relation to the outer circumferential surface of the carbon ring to separate this surface from exposure to the pressure exerted by the sealed fluid. There is no communication between the inner and outer circumferential surfaces of the carbon ring to equalize the pressures on these surfaces, nor is there any attempt to equate the axial pressures.

Martinson, U.S. Pat. No. 4,272,084, describes and claims a multi-stage mechanical seal assembly for pumps of the kind before enumerated. However, the problem of seal ring distortion is not discussed, no back-up ring of a high modulus of elasticity axially abutting a seal ring of a lower modulus of elasticity is used.

Wiese, the applicant herein, in earlier U.S. Pat. No. 3,813,103, discloses a mechanical seal assembly in which the back-up ring has a marginal portion exposed in a pressure chamber in the seal housing, and the nonrotatable seal ring (backed up by the back-up ring) is ported to allow flow of fluid into the pressure chamber from between the sealing faces to reduce the distortion of the back-up ring and the stationary seal ring.

While the latter may be effective for some installations, it has not been found to be effective where the pressure differentials are as experienced in pumps of the type above described.

Wiese, in U.S. Pat. No. 4,114,900, teaches a mechanical seal in which a rotatable seal ring is provided with an internal radial, annular chamber exposed to low pressure fluid via a radial passage, such that high pressure on the seal ring at a seal face distorts the ring and causes it to be convex. The degree of convexity determines the leak rate across the seal faces. There is no attempt to eliminate distortion of one seal ring; distortion of the seal ring is actually caused by the construction.

SUMMARY OF THE INVENTION

The mechanical seal assembly of this invention comprises the combination of a rotatable seal ring and a stationary seal ring, the seal rings having seal faces which oppose one another and across which the flow of a fluid from a high pressure zone to a low pressure zone along the rotatable shaft is substantially prevented. The rotatable seal ring, in the preferred embodiment, is made of a carbide material, and the stationary seal ring, or at least its seal face, is made of a softer material, such as carbon. The stationary seal ring has a rear face mating with a face of back-up ring and the back-up ring is supported for limited axial movement on a cylindrical balance sleeve surrounding the shaft. The balance sleeve has a stepped outer surface and there is provided an annular surface exposed to high pressure fluid. The balance sleeve is received in a cylindrical cavity in a seal flange of a housing and is biased by fluid pressure on its annular surface to insure its seating in the cavity. The back-up ring and the stationary seal ring are resiliently urged toward the rotating seal ring by a plurality of coil springs.

The mechanical seal assembly of this invention is constructed in such a manner to substantially, if not totally, eliminate compressive loads on the outer periphery of the softer seal ring which causes distortions and deflections of this seal ring and leads to failure of the seal assembly. This is accomplished by encircling the softer seal ring and its back-up ring with a cylindrical member, and by providing one or more passages in the seal ring and back-up ring subassembly to insure equalization of fluid pressures on their inner and outer surfaces. The fit of the cylindrical member around the seal ring and its back-up ring is such to permit fluid to exist therebetween and the outer surface of the cylindrical member is exposed to the high pressure fluid. Also, the seal ring and back-up ring subassembly is constructed so that axial fluid pressure on the back-up ring is sufficient to insure sealing of the mating faces of the soft seal ring and the back-up ring, and to limit the transmissions of deflections of the back-up ring to the softer seal ring. Axial fluid pressures on the opposite sides of the stationary seal ring are substantially balanced, which insures little, if any, deflections of the softer seal ring which could be caused by axial pressure differentials.

BRIEF DESCRIPTION OF THE DRAWING

FIG. 1 is a partial cross-sectional view of the preferred embodiment of this invention, and FIG. 2 is a partial cross-section view of a second embodiment of this invention.

DESCRIPTION OF THE PREFERRED EMBODIMENT

FIG. 1 illustrates the preferred embodiment of a mechanical seal assembly 10 which can be used as a single seal, or in a more comprehensive assembly, such as a multiple stage mechanical seal. Seal assembly 10 comprises shaft sleeve 12 adapted to be positioned over and connected (by means not shown) to shaft 14, the seal substantially preventing the flow of fluid along shaft 14 from a high pressure region or zone 16; for example, a pump (not shown), to a low pressure region or zone 18, for example, a motor (also not shown). A gasket (not shown) is provided between sleeve 12 and the shaft 14 to prevent the flow of fluid therebetween.

Seal assembly 10 further comprises rotating seal ring 20 and stationary seal ring 22, rings 20 and 22 being spaced from shaft sleeve 12 and having lapped seal faces 24, 26 opposing one another, the face 26 being an annular surface with an ID greater than the ID of ring 20 and an OD less than that of the ring 20. A surface 28 of ring 22 is exposed to high pressure fluid in region 16. Seal ring 20 is connected to sleeve 12 by key 27 or by other suitable well known means and has a rear portion received in retainer 30 positioned on shaft 14 by split ring 32 received in complementary grooves in sleeve 12 and retainer 30. Retainer 30 is sealed to sleeve 12 by O-ring 34 and to ring 20 by O-ring 36.

Seal ring 22, the relatively softer seal ring in this embodiment and preferably constructed of carbon, is encircled by a generally cylindrical member 38 which also encircles back-up ring 40. The fit between member 38 and rings 22 and 40 is such that fluid can be present therebetween. Back-up ring 40 is also spaced from shaft sleeve 12 and has an annular face portion 42 abutting rear face portion 44 of ring 22. Member 38 has a radial depending flange 46 sealed to surface 28 of ring 22 by O-ring 48. Snap ring 50, which fits in a groove in member 38 and abuts rear face 52 of back-up ring 40, holds rings 22 and 40 in their proper, abutting positions. Back-up ring 40 has a first cylindrical portion 40A and a second cylindrical portion 40B which is mounted on cylindrical balance sleeve 54 for limited axial movement. Balance sleeve 54 encircles shaft sleeve 12 and is spaced therefrom, such that low pressure fluid from low pressure region 18 exists between shaft sleeve 12 and rings 20, 22 and 40. O-ring 56 encircles back-up ring 40 and seals an end thereof with member 38 and O-ring 58 encircles balance sleeve 54, and seals sleeve 54 with rear portion 40B of back-up ring 40 while permitting the limited axial movement of back-up ring 40 relative to balance sleeve 54. Balance sleeve 54 is sealed to seal flange 60 of housing 62 by O-ring 64, and has its outer diameter stepped to provide an annular, radially disposed surface 54A. Balance sleeve 54 abuts a shoulder 60A of the housing flange 60, and fluid pressure on surface 54A biases the balance sleeve against shoulder 60A to insure the seating of sleeve 54 in housing 60. Housing flange 60 is part of a more comprehensive housing 62, not all of which is shown.

Coil springs 66, only one of which is shown in FIG. 1, bias the subassembly of seal ring 22, back-up ring 40 and member 38 toward rotatable seal ring 20. Springs 66 are each received in a spring pocket 68 in housing 62 and spring pocket 70 in outwardly extending radial flange 72 of member 38. Springs 66 are essentially enclosed by a generally cylindrical cover 74 which encircles flange 72 of member 38 and is bolted to housing flange 60.

The rear surface 52 of back-up ring 40, the rear surface 51 of the member 38 and the annular surface 61 of housing flange 60, cooperatively define an annular cavity 76 open to high pressure fluid. Back-up ring 40 is axially drilled at 78 to provide a fluid passageway between cavity 76 and cavity 80, cavity 80 being defined by O-rings 82, 84, a portion 86 of a rear face 44 of seal ring 22, and reduced portion 88 of the front face 42 of back-up ring 40. The effective pressure on face 86 is substantially the same as on face 28. Thus the fluid pressures on opposite ends of seal ring 22 are substantially the same.

The inner surfaces of the stationary seal ring 22 and its back-up ring 40 are spaced from shaft sleeve 12 and define, with shaft sleeve 12, a first zone 90 communicating with low pressure zone 18, and the outer surfaces of seal ring 22 and back-up ring 40 define, with member 38, a second zone 92. To insure that the pressure on the outside surface of seal ring 22 in zone 92 is the same as on the inside surface of seal ring 22 in zone 90, back-up ring 40 is radially drilled at 94 and member 38 is angularly drilled at to provide a fluid passage 96 bridging O-ring 82. Because the pressure on the inner and outer surfaces of the seal ring 22 and the back-up ring 40 is the same or substantially the same, compressive loads due to pressure differentials do not exist and distortions and deflections of the softer seal ring 22 which are usually caused by such pressure differentials are completely or substantially eliminated.

FIG. 2 illustrates a second embodiment of this invention and shows mechanical assembly 100 for substantially preventing the flow of fluid along shaft 102 from high pressure region 104 to low pressure region 106. Seal assembly 100 comprises rotatable seal ring 108 and stationary seal ring 110, having a face 112, 114, respectively, opposed to one another. Seal ring 108 is keyed by key 116 to shaft sleeve 118 and its end abuts sleeve flange 120, being sealed thereto by O-ring 122. The axial position of ring 108 is fixed by snap ring 124, as illustrated.

Stationary seal ring 110 is a composite, constructed of a carbon face portion 110A and a metal backing portion 110B, and is encircled by generally cylindrical member 126 which has inwardly directed flange 128 sealed to ring 110 by O-ring 130. Back-up ring 132 has a first cylindrical portion 132A and a rearwardly extending cylindrical portion 132B. Portion 132A has annular face portion 134 abutting rear face 136 or ring 110. Back-up ring 132 is also encircled by member 126. The fit between seal ring 110, back-up ring 132 and member 126 is such that fluid can be present therebetween. Snap ring 138 abutting the rear face 140 of ring 132 insures the proper positioning of rings 110 and 132 within the base of 126, and O-ring 142 encircles ring 132 at a location adjacent to snap ring 138, thus sealing the juncture of ring 132 and member 126. Portion 132B of ring 132 encircles balance sleeve 144, which in turn encircles and is spaced from sleeve 118. Seal ring 110, back-up ring 132 and balance sleeve 144 are all spaced from shaft sleeve 118, so that annular space 145 between seal rings 110, back-up ring 132 and balance sleeve 144 is open to low pressure zone 106. Balance sleeve 144 has its outer periphery stepped to provide an annular, radially disposed surface 144A. Sleeve 144 abuts shoulder 146 of housing flange 148. Pressure on surface 144A biases the balance sleeve against shoulder 146 to insure seating of sleeve 144 in housing flange 148. Cavity 150 in ring 144 receives elastomer U-cup 152 and bull-nosed U-cup follower 154. Pockets 156 in housing flange 148 each receive a spring 158 to bias follower 154, back-up ring 132, and seal ring 110 toward seal ring 108.

Rear surfaces 140 of back-up ring 132 and 141 of member 126 are exposed to high pressure fluid in cavity 160, and ring 132 is axially drilled, as at 162, to communicate high pressure fluid to annular cavity 164 defined by O-rings 166, 168, a portion of rear face 136 of ring portion 110B and reduced part 170 of face 134 of back-up ring 132. Springs 158 insure seating of the faces 134 and 136 of back-up ring 132 and seal ring 110. Back-up ring 132 and the front face 172 of metal ring portion 110B are radially drilled at 174 and the front face 172 of metal ring portion 110B is radially grooved at 176 to provide communication between zones 145 and 180 and also between 145 and 180. Thus the pressure on the outside surfaces of rings 110 and 132 are essentially the same as the pressure on the inside surfaces of these rings. Substantial elimination of pressure differentials on the inside surfaces and outside surfaces of seal ring 110 and back-up ring 132 substantially eliminates compressive loads on ring portion 110A. Also the pressure on face portion 184 of ring portion 110A is essentially the same as that in cavity 164, so that axial fluid pressures on ring 110 are essentially balanced.

The O-ring seals where used are generally made of elastomeric materials, such as synthetic rubber and the like.

While the invention has been described with reference to two embodiments, it is to be understood that reasonable equivalents of the structure are included in the coverage.

I claim:

1. A mechanical seal assembly for substantially preventing the flow of a fluid along a rotatable shaft from a high pressure region to a lower pressure region, said seal assembly being associated with a housing and comprising:
 a pair of relatively rotatable seal rings having opposed seal faces, one seal ring being connected to said shaft and the other seal ring being connected to said housing and spaced from said shaft;
 a back-up ring for one of said seal rings and spaced from said shaft, said back-up ring being constructed of a material having a different modulus of elasticity than said one of said seal rings, said one of said seal rings and said back-up ring having annular mating faces;
 a first zone communicating with said lower pressure region and bounded in part by the inner surfaces of said one seal ring and said back-up ring;
 a generally cylindrical member closely surrounding said one of said seal rings and said back-up ring and exposed at its outer surface to high pressure in said high pressure region, said member forming with the outer surfaces of said one of said seal rings and said back-up ring a second zone sealed from high pressure fluid; and
 passage means communicating said first zone and said second zone so that low pressure fluid exists on the inner and outer surfaces of said one seal ring and said back-up ring and thus substantially prevent distortion of said one of said seal rings and said back-up ring because of pressure differentials between their inner and outer surfaces.

2. A mechanical seal assembly as recited in claim 1, in which said back-up ring has an annular surface exposed to fluid in said high pressure region, and further comprising an annular chamber between said one of said seal rings and said back-up ring, and a passage communicating said annular chamber and said high pressure region.

3. A mechanical seal assembly as recited in claim 2, wherein said passage is located in said back-up ring.

4. A mechanical seal assembly as recited in claim 1, wherein at least a portion of said passage means is located in said back-up ring.

5. A mechanical seal assembly as recited in claim 4, in which a portion of said passage means is located in said surrounding member.

6. A mechanical seal assembly as recited in claim 2, in which an annular front surface on said one of said seal rings is exposed to fluid in said high pressure region and an annular back surface of said one of said seal rings further defines said annular chamber.

7. A mechanical seal assembly as recited in claim 2, which said one of said seal rings is carbon and said back-up ring is steel.

8. A mechanical seal assembly as cited in claim 7, in which said one of said rings is a composite of carbon and steel.

9. A mechanical seal assembly as recited in claim 1, further comprising a cylindrical balance sleeve surrounding and spaced from said shaft, said balance sleeve having a first diameter portion supporting said back-up ring and a second and larger diameter portion received in a recess in said housing, the first and second diameter portions defining an annular shoulder surface exposed to fluid in said high pressure region, the fluid pressure of which biases said balance sleeve toward said recess to insure it being seated in said recess.

10. A mechanical seal assembly as recited in claim 9, further comprising a shaft sleeve closely surrounding said shaft, said other seal ring being connected to said shaft sleeve.

11. A mechanical seal assembly for substantially preventing the flow of a fluid along a rotatable shaft from a high pressure region to a lower pressure region, said seal assembly being associated with a housing, comprising:
- a pair of relatively rotatable seal rings surrounding said shaft and having opposed faces, one seal ring being connected to said shaft and the other seal ring being spaced from said shaft and connected to said housing;
- means urging one seal ring toward the other seal ring;
- a back-up ring for one of said seal rings, said one of said seal rings and said back-up ring having annular mating faces, said back-up ring surrounding and being spaced from said shaft;
- a cylindrical balance sleeve surrounding and spaced from said shaft, said balance sleeve having a first diameter portion supporting said back-up ring and a second and larger diameter portion, the first and second diameter portions defining an annular, radially disposed surface, said annular surface being exposed to fluid in said high pressure region;
- a cylindrical recess in said housing, said recess receiving and forming a seat for said second and larger diameter portion of said cylindrical balance sleeve;
- said balance sleeve being biased into said recess by the fluid pressure on said annular surface.

12. A mechanical seal assembly as recited in claim 11, further comprising a shaft sleeve surrounding said shaft in closely spaced relationship and supporting the other of said seal rings.

* * * * *